United States Patent [19]

Wang

[11] 3,832,568

[45] Aug. 27, 1974

[54] CIRCUIT FOR GENERATING A SINGLE HIGH VOLTAGE SUBNANOSECOND PULSE FROM A STEP RECOVERY DIODE

[75] Inventor: Chao C. Wang, West Concord, Mass.

[73] Assignee: Sperry Rand Corporation, New York, N.Y.

[22] Filed: Aug. 10, 1973

[21] Appl. No.: 387,573

[52] U.S. Cl. .................... 307/106, 307/261, 328/67

[51] Int. Cl. .................... H03k 3/00

[58] Field of Search ...... 307/106, 258, 261; 328/66, 328/67, 56

[56] References Cited

UNITED STATES PATENTS

| | | | |
|---|---|---|---|
| 3,167,661 | 1/1965 | Rhodes | 328/66 |
| 3,171,040 | 2/1965 | Goebel | 328/67 |
| 3,299,294 | 1/1967 | Koehler | 307/261 |

*Primary Examiner*—David Smith, Jr.
*Attorney, Agent, or Firm*—Howard P. Terry; Thomas J. Scott

[57] ABSTRACT

A series connected electronic circuit including in combination a trigger generator, an impulse generator, a filter circuit having an inductance L, a step recovery diode having a forward resistance $R_F$ and a reverse capacitance $C_R$ and an optimal bias circuit coupled to the step recovery diode. The trigger generator produces a train of pulses having a relatively long time interval, T, between each pulse; these pulses are then coupled to the impulse generator which produces an impulse having a Fourier component predominant at a frequency $\omega$ in response to each trigger pulse. The filter circuit converts each impulse into a damped sine wave having an angular frequency $\omega$ and a damping constant $\delta \doteq R_F/2L$. The sine wave is coupled to the step recovery diode which generates a single high voltage subnanosecond pulse having a half period, $t_p/\pi \doteq \sqrt{LC_R}$ in response to each damped sine wave.

15 Claims, 25 Drawing Figures

CIRCUIT FOR GENERATING A SINGLE HIGH VOLTAGE SUBNANOSECOND PULSE FROM A STEP RECOVERY DIODE

BACKGROUND OF THE INVENTION

1. Field of the Invention

The subject invention pertains to the field of pulse generator circuits and particularly to circuits for providing high voltage pulses having subnanosecond pulse widths and relatively long time intervals between pulses.

2. Description of the Prior Art

The use of a mercury relay switch as the key element in periodically discharging a transmission line which has been charged to a high voltage through a long time constant is known in the prior art. This technique provides subnanosecond pulses having rise times in the order of 100 picoseconds and a peak pulse voltage of several hundred volts. However, because of the mechanical limitations of the vibrating reed, these switches cannot be operated at very high duty cycles. The mechanical contacts tend to deteriorate resulting in jittery and noisy pulses. Since the deterioration of the mechanical contacts is proportional to the number of times the contacts are being opened and closed, the life of the switch is inversely proportional to the duty cycle. In addition, the life of the mercury relay switch is further shortened when used with higher operational voltages.

One obvious solution to the mechanical limitations of a mercury relay switch is to replace the switch by a solid state device which is capable of switching currents at a rapid rate. It is well known that a step recovery diode can be used to generate a series of impulse functions by driving the diode through an inductive-capacitive resonating circuit by a continuous wave source. In such a configuration the repetition rate of the impulses produced by the step recovery diode would be the same as the driving frequency of the source.

Alternatively the continuous wave source can be pulses at time intervals that are long in comparison to the driving frequency of the source, thereby generating groups of "picket fence" pulses at time intervals that are also long in comparison to the driving frequency. However, certain applications such as radar require that only a single sharp risetime pulse be generated at fixed relatively long time intervals. The term "relatively long time intervals" is defined as a time interval that is much longer in duration than the target return time in a radar system.

The subject invention incorporates an optimally biased step recovery diode which is not effected by the mechanical limitations of the vibrating reed in a mercury relay switch and therefore it can operate reliably at very high duty cycles. Further, by employing a filter circuit to provide a damped sine wave input to the optimally biased step recovery diode a single pulse is produced at time intervals that are long in comparison to the driving frequency thereby avoiding the necessity of providing impulses having a repetition rate which is the same as the driving frequency of a continuous wave source.

SUMMARY OF THE INVENTION

The invention comprises an electronic circuit including a source of trigger pulses such as a trigger generator coupled to an impulse generator or a series combination of a step function generator and a differentiating circuit. The output impulses produced by these devices are coupled to a filter circuit having a predetermined value of inductance L. The filter circuit in response to an applied impulse produces a damped sine wave oscillation which is coupled to a step recovery diode circuit. The step recovery diode may be biased by an active or a passive circuit. If a passive circuit is used for the bias control circuit the method of producing the output pulse from the step recovery diode is referred to as the "second reverse discharge" method. Whereas if the bias control circuit is an active circuit which includes a source of electrical power the method by which the step recovery diode produces an output pulse is referred to as the "first reverse discharge" method.

These names result from the fact that in the first reverse discharge method the step recovery diode generates a single high voltage subnanosecond pulse during the first half cycle of the damped sine wave oscillation current coupled to the step recovery diode; whereas in the second reverse discharge method the step recovery diode generates a single high voltage subnanosecond pulse during the second half cycle of the damped sine wave oscillating current coupled to the step recovery diode.

The parameters of the different circuit elements are designed such that the filter circuit converts each impulse into a damped sine wave having an angular frequency $\omega$ and a damping constant $\delta \doteq R_F/2L$ in which $R_F$ is the forward resistance of the step recovery diode and L is the predetermined value of inductance in the filter circuit.

The bias circuit coupled to the step recovery diode is designed to provide either an optimum or substantially optimum bias for the step recovery diode which will enable the step recovery diode to produce a single high voltage subnanosecond pulse in response to the damped sine wave oscillation produced by each impulse. The half period of the resultant single subnanosecond pulse is determined by the inductance L in the filter circuit and the reverse compacitance $C_R$ of the step recovery diode such that the single subnanosecond pulse has a half period, $t_p/\pi \doteq \sqrt{LC_R}$.

The foregoing combination of elements provides a simple economical electronic circuit including a step recovery diode for generating a single high voltage subnanosecond pulse.

DESCRIPTION OF THE PREFERRED EMBODIMENT

Figure 1:
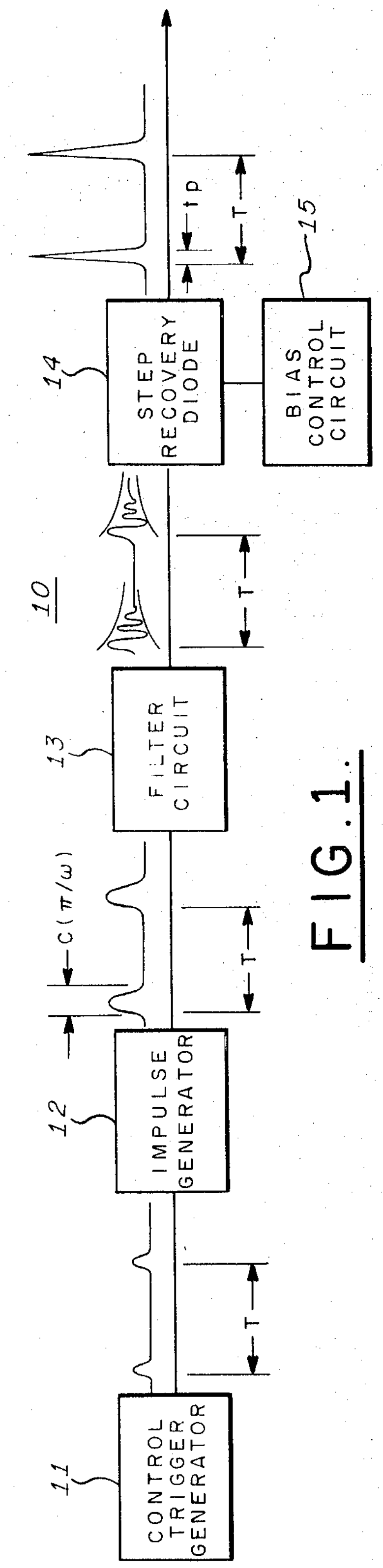
FIG. 1 is a block diagram of a pulse generator circuit incorporating the subject invention.

A circuit 10 for generating a single high voltage narrow pulse as shown in FIG. 1 includes a control trigger generator 11 which provides a plurality of trigger pulses having sufficient amplitude to activate an impulse generator 12. The trigger pulses have a repetition period T. The impulse generator 12 can be a step function generator coupled to a differentiating circuit or an impulse function generator. The output pulses produced by the impulse generator 12 has a repetition period T identical to the repetition period T of the trigger pulse produced by the control trigger generator 11. The pulse width C of the impulses produced by the impulse generator 12 is equal to $\pi/\omega$. The magnitude of the pulse width C is very much smaller than the repetition period T.

A filter circuit 13 coupled to the impulse generator 12 converts the received impulses from the impulse generator 12 into damped sine waves having an angular frequency, $\omega$, and a damping constant, $\delta$. The efficiency of the filter circuit 13 is determined by the Fourier component of the impulses received from the impulse generator 12. Thus to be efficient these impulses must have Fourier components predominant in the range of the angular frequency $\omega$, i.e., the inverse of the rise or fall time of the impulses must be very close to the angular frequency $\omega$.

A step recovery diode 14 coupled to the filter circuit is responsive to the damped sine waves produced by the filter circuit 13. A bias control circuit 15 coupled to the step recovery diode 14 controls the operation of the step recovery diode 14. Thus if the bias control circuit 15 is adjusted to allow continuous wave (CW) operation of the step recovery diode 14 then a series of pulses of decreasing magnitude will be produced in response to the damped sine waves produced by the filter circuit 13. However, in the preferred embodiment the object is to obtain a single pulse output in response to each trigger pulse produced by the control trigger generator 11. Therefore, the bias control circuit 15 must be adjusted to allow only a single output pulse to be produced in response to each damped sine wave produced by the filter circuit 13.

Figure 2:
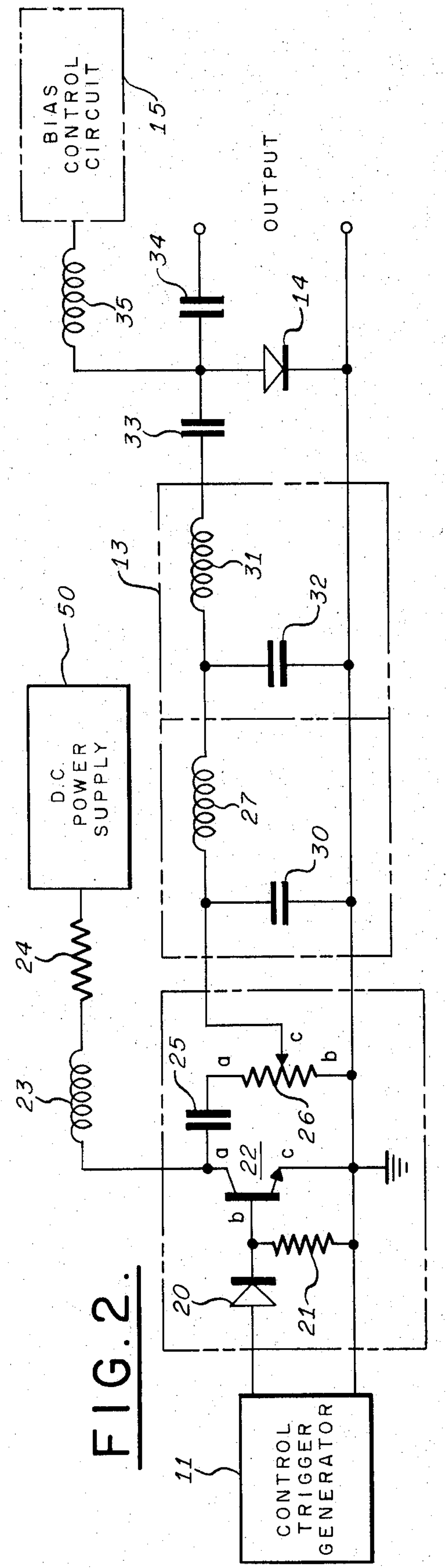
FIG. 2 is a schematic diagram of the pulse generating circuit shown in FIG. 1.
Figure 2A:
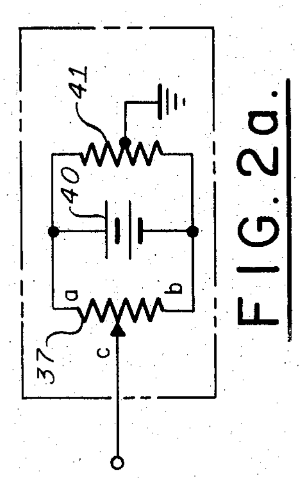
FIG 2*a* is a schematic diagram of a bias control circuit for use in the pulse generating circuit incorporating the subject invention.
Figure 2B:
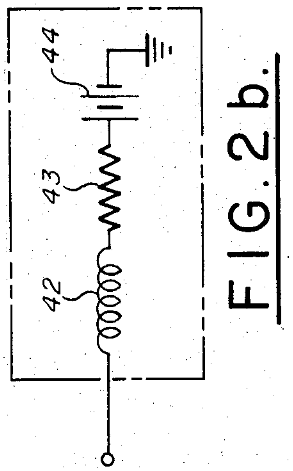
FIG. 2*b* is a schematic diagram of an alternate bias control circuit for use in the pulse generating circuit incorporating the invention.
Figure 2C:
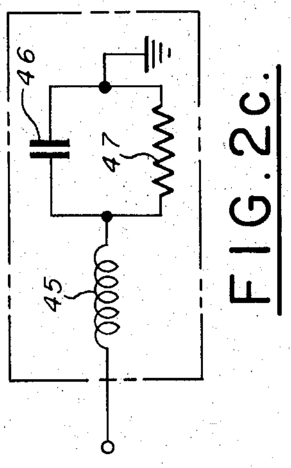
FIG. 2*c* is a schematic diagram of a second alternate embodiment of a bias control circuit for use in the pulse generating circuit incorporating the subject invention.

A specific embodiment of the invention is shown in the schematic diagram in FIG. 2 which includes a plurality of bias circuits in FIGS. 2*a*, 2*b* and 2*c* which may be employed with the control trigger generator 11, impulse generator 12, filter circuit 13 and step recovery diode 14 to provide a single pulse output from the step recovery diode 14 in response to each damped sine wave produced by the filter circuit 13.

Alternatively, the output pulse may be taken across the inductor 31 instead of across the diode 14 by coupling the capacitor 34 to the junction of condenser 32 and inductor 31 and coupling the other output terminal to junction of inductor 31 and condenser 33. For the fast pulse voltage, the output voltage across inductor 31 is equal and opposite to that across diode 14 since the voltage drop across condenser 32 is negligible.

In the schematic diagram of FIG. 2 the control generator 11 is coupled to the plate of an input diode 20 which has its cathode connected to the junction of a base resistor 21 and the base terminal *b* of a common emitter mode transistor 22. The other terminal of the resistor 21 and the emitter terminal *c* of the transistor 22 are connected to ground. The collector terminal 22*a* of the transistor is coupled through the series combination of an inductor 23 and a resistor 24 to a high voltage d.c. power supply 50. A coupling capacitor 25 has one terminal connected to the junction of the collector terminal 22*a* and the inductor 23. The other terminal of the coupling capacitor 25 is connected to first terminal 26*a* of a variable resistor. The variable resistor has a second terminal *b* connected to ground and its wiper arm *c* connected to a filter circuit 13 comprised of two half-T sections. The first half-T section of the filter 13 includes a capacitor 30 coupled between the wiper arm *c* of the variable resistor 26 and ground in combination with an inductor 27 having one terminal connected to the junction of wiper arm 26*c* and capacitor 30 and its other terminal connected to the junction of a capacitor 32 and the first terminal of an inductor 31 in the second half-T section. The other terminal on the capacitor 32 is connected to ground. The other terminal on the inductor 31 in the half-T section is connected to a coupling capacitor 33 which has its other terminal connected to the plate of a step recovery diode 14. The other terminal on the capacitor 32 in the second half-T section and the cathode of the step recovery diode 14 are connected to ground. The junction of the capacitor 33 and the plate of the step recovery diode 14 is also connected to an output coupling capacitor 34 and an inductor 35 which has its other terminal connected to the bias control circuit 15.

Various combinations of electronic circuit elements may be used in the bias control circuit 15. As shown in FIG. 2*a*, a first configuration includes a variable resistor 37 having its wiper arm 37*c* connected to the second terminal on the inductor 35 while the other terminals *a* and *b* are connected across the parallel combination of a d.c. source 40 and a second resistor 41 which is center tapped to ground.

As shown in FIG. 2*b* a second configuration which may be used in the bias control circuit 15 includes an inductor 42 which is coupled to the second terminal of the inductor 35 and has its second terminal connected to the series combination of a resistor 43 and a d.c. voltage source 44.

A third combination shown in FIG. 2*c* which may be used for the bias control circuit 15 includes an inductor 45 having one terminal connected to the second terminal of the inductor 35 and has its other terminal connected to the parallel combination of a capacitor 46 and a resistor 47 in which the other terminal of the parallel combination is connected to ground.

In order to understand the basic operation of the invention, the operation of the prior art configuration employing a CW source to drive a step recovery diode through an inductive-capacitive resonating circuit will be reviewed first. In this configuration, the driving CW source is always present even after the steady state condition is established. This configuration is essentially a forced driving circuit and the steady state condition is the response of the step recovery diode to the forcing frequency which is the frequency that the inductive-capacitive resonating circuit is closely tuned to. Further, in the prior art configuration, the free oscillation or transient response has died out prior to attaining the steady state condition.

Figure 8:
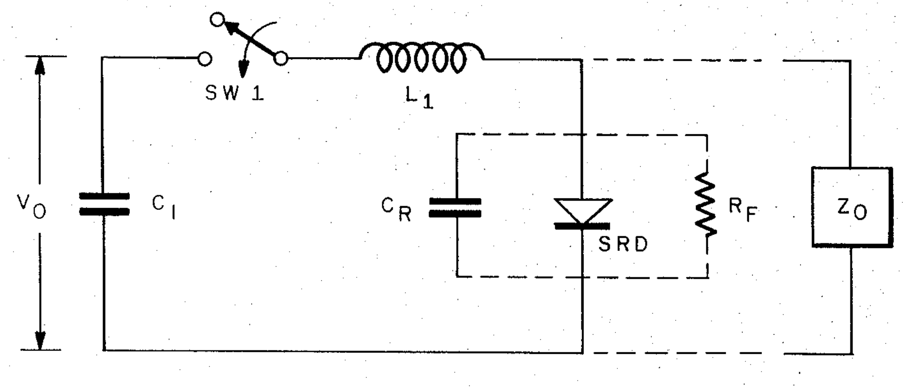
FIG. 8 is a schematic drawing of an equivalent LCR series circuit including a switch.

In the present invention where a single pulse is to be produced, the input impulse function is short in comparison with the free oscillation. Therefore, the response is essentially the product of the free oscillation or transient response of the circuit to the input impulse function. The response of the filter circuit 13 with a step recovery diode 14 forward-biased to the impulse function can be considered as the classical analysis of a series inductive capacitive resistive (LCR) circuit such as the equivalent circuit shown in FIG. 8 except for some details in the actual build-up during the first half period that will depend upon the driving function. In the LCR circuit, the capacitor is initially charged to a value $V_o$ with a charge $Q_o = V_o C_1$ as a result of closure of the switch $S_w$. 1 as shown in FIG. 8. The charge $Q_o$ is equivalent to the charge provided by an impulse generator such as impulse generator 12 of FIGS. 1 and 2.

Figure 3A:
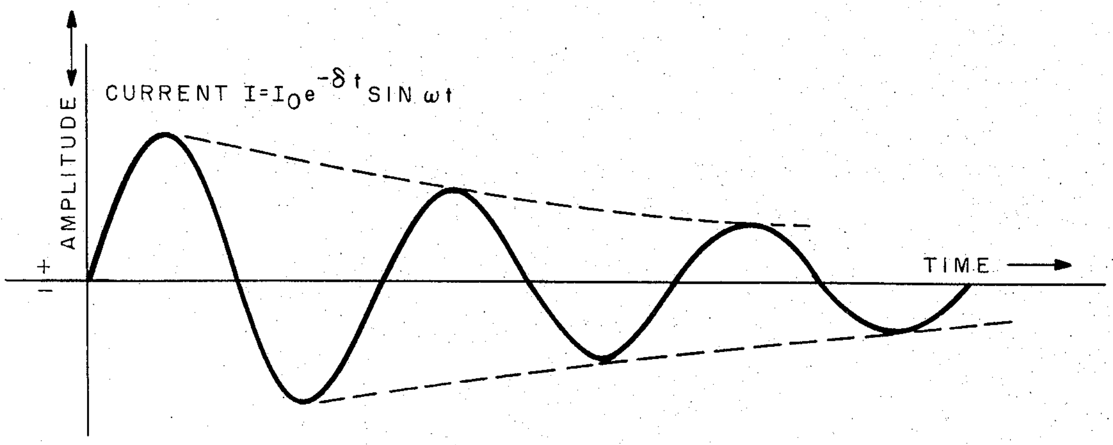
FIG. 3*a* is a plot of a current waveform produced in an LCR circuit equivalent to a circuit including a step recovery diode in its conducting state.
Figure 3B:
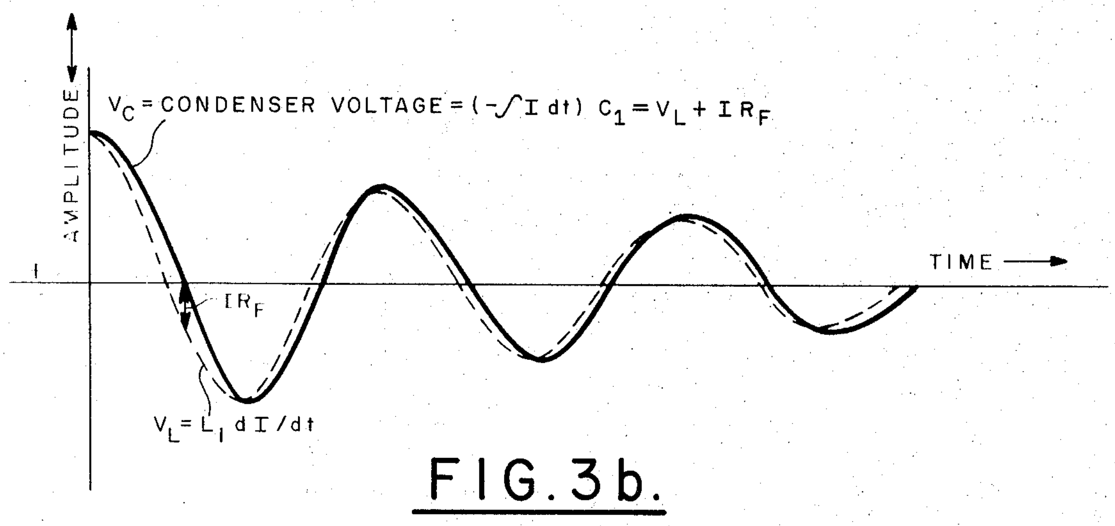
FIG. 3*b* is a plot of condenser voltage and inductor voltage in the equivalent LCR circuit.

A typical plot of the damped current I is shown in FIG. 3*a* and a plot of the voltage across the capacitor, $V_c$ is shown in FIG. 3*b*. The condenser voltage is defined as $(-\int Idt)C_1$; the voltage across the coil is defined as $L_1 dI/dt$ and is represented in FIG. 3*b* by the dotted plot line. The difference between the voltage across the coil $L_1$ and the voltage across the capacitor $C_1$ is the voltage drop across the resistor, $IR_F$.

Application of a d.c. bias to the junction of the inductor $L_1$ and the resistor $R_F$ will produce an exponential increase in current which will be superimposed upon the damped sine wave shown in FIG. 4. Further, the bias voltage will also be added to the voltage across the capacitor, $V_c$. The magnitude shape and number of pulses which will be generated by the pulse generator circuit is determined by the value of current and voltage at the time when the step recovery diode switches. Further, different values of bias produce different combinations of voltage, current and damped frequencies in the output of the pulse generator circuit. As a result, varying the bias current provides control of the magnitude, shape and number of pulses to be generated.

For the purposes of this analysis, it may be assumed that the step recovery diode can be idealized to be capable of acting as a switch. When the step recovery diode has sufficient charge stored in the I region of the diode, it acts as a short-circuit with a very low resistance as the low value of resistance assumed for $R_F$ and indicated in FIG. 8 by the resistor $R_F$ coupled by dotted lines across the step recovery diode. If the charge is withdrawn at any time, the step recovery diode suddently turns into an insulator with only a small capacitance $C_R$ as indicated in FIG. 8 by the capacitor $C_R$ coupled by the dotted lines across the step recovery diode. After the switching action has occurred, the low value resistance $R_F$ is replaced by the capacitance $C_R$ which is shunted by a load resistance $Z_o$. The influence of the load resistance $Z_o$ may be ignored because its major effect is simply to slightly modify the generated output pulse.

At the time the step recovery diode is switching from its short circuit condition to its insulating condition, the current I must be negative in the sense that it is withdrawing charge from the step recovery diode but there can also be residual voltage across the capacitor $C_1$ which voltage is referred to above as the condenser circuit voltage $V_c$. This voltage $V_c$ may have different signs as determined from the sign of the charge accumulated on the capacitor $C_1$. With a negative current I in the inductor $L_1$ and a zero voltage on the step recovery diode capacitance $C_R$, the accumulated charge on the capacitor $C_1$ provides the voltages $V_c$ which make up the new initial transient conditions.

Figure 4A:
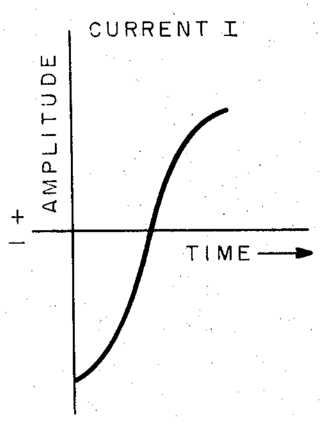
FIGS. 4*a* and 4*b* are plots of current and voltage waveforms during switching of a step recovery diode with zero condenser voltage.
Figure 4C:
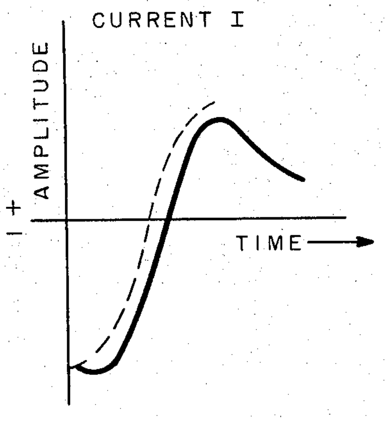
FIGS. 4*c* and 4*d* are plots of current and voltage waveforms during switching of a step recovery diode with a negative condenser voltage.
Figure 4E:
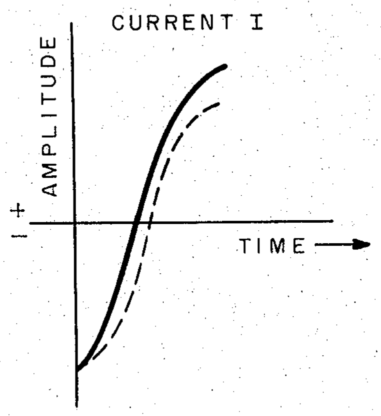
FIGS. 4*e* and 4*f* are plots of current and voltage waveforms during switching of a step recovery diode with a positive condenser voltage.
Figure 4B:
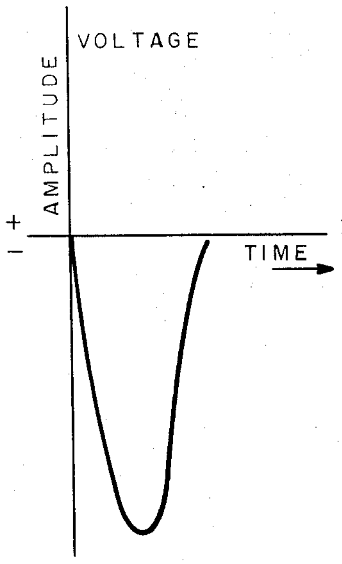

If the condenser circuit voltage $V_c$ is zero, then the transient may be analyzed as a simple case of discharging the negative current I in $L_1$ through a series circuit. Since the condenser $C_1$ is much greater than the capacitance $C_R$, the capacitance $C_R$ determines the frequency of the current I as 1/2 $t_p$. The current I shown in FIG. 4*a* executes a cosine wave in which it reverses sign in going from a negative peak to a positive peak. It will be noted that the magnitude of the positive peak is less than the magnitude of the negative peak and this result occurs due to losses in the circuit. The output voltage across the capacitance $C_R$ appears as a damped initially negative going sine wave of which only the first half cycle is shown in FIG. 4*b*.

Figure 4D:
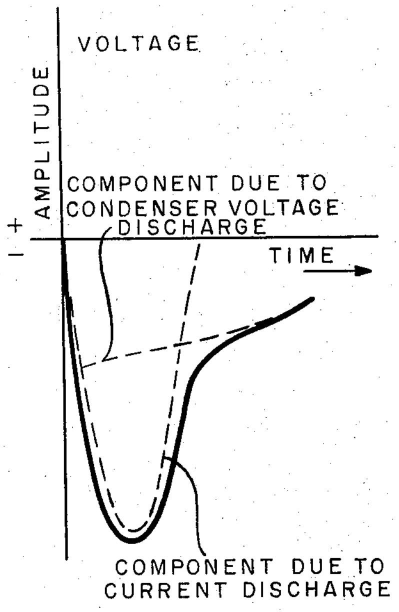
Figure 4F:
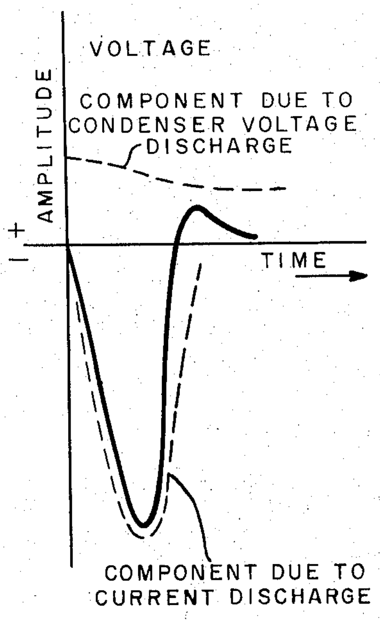

Now, if a negative voltage is present on the condenser $C_1$, then this voltage will also discharge through the inductance $L_1$ and the output load $Z_o$. The current produced from this voltage will also produce a damped sine wave or even an exponentially damped sine wave having a much higher damping constant than that shown in FIG. 3 because the load resistance $Z_o$ is much larger than the short circuit resistance $R_F$ of the step recovery diode. This current must be added to the current produced by simply discharging the current in the inductor $L_1$ in the series circuit when the condenser voltage was zero. The additional current and the resultant current are shown in FIG. 4*c*. It will be noted that the resultant current is more negative than in the previous case, at the same time the output voltage shown in FIG. 4*d* is also more negative than in the previous case. The current in the inductor $L_1$ is produced by the differential of two voltages; the first being the voltage across the condenser $C_1$ and the second being the voltage across the step recovery diode capacitance $C_R$ which is due to the discharge current alone. Since both of these voltages are negative, it is the algebraic difference of these two voltages that determines the rate of change of the current in the inductance $L_1$. As the voltage across the capacitance $C_R$ is sweeping downward, the difference of these two voltages diminishes until they cross each other at which point the positive current will be a maximum. Beyond this point the voltage across the capacitance $C_R$ is less than the voltage across the condenser $C_1$ thus the positive current decays to zero. Simultaneously, the voltage across the capacitance $C_R$ will asymptotically approach the voltage across the capacitance $C_1$ and decay with it. (The voltage on a step recovery diode will remain negative and non-conducting). As long as the step recovery diode SRD remains negatively biased, i.e., there is a negative charge on the capacitance $C_R$, the step recovery diode can only draw positive current, as in the case after the capacitor $C_1$ was charged initially by the reversed negative current. As soon as the accumulated negative charges are exhausted, the positive current ceases which accounts for the reason why the integrated area under the positive current curve in FIG. 4*c* is roughly equal to that under the negative current curve.

When a negative voltage is present across the capacitor $C_1$ during the time switching in the step recovery diode is taking place, the net result is that the impulse output shown in FIG. 4d that is produced by the step recovery diode is less than a complete pulse. In other words, the downward swing of the pulse does not go to zero but instead trails off slowly, i.e., asymptotically approaching the zero base line. The incompleteness of the pulse will depend upon the relative magnitude of the negative voltage present across the capacitor $C_1$ at the time the switching of the step recovery diode takes place. Furthermore, after the switching of the step recovery diode has taken place with a negative voltage across the capacitor $C_1$, the pulse produced will be the last pulse of the damped train wave. Subsequently, the step recovery diode will not be recharged until the end of the pulse train because the step recovery diode will remain in a negative bias condition.

When the voltage across the condenser $C_1$ is positive during the switching of the step recovery diode an opposite result is produced. The resultant current shown in FIG. 4*e* that is produced in the circuit is more positive through the addition of the positive bias in the series circuit. The output voltage shown in FIG. 4*f* has a steeper descent as a result of the positive bias in the series circuit. In some instances, the downward sweep of the output voltage can overshoot to a somewhat negative value. However, the step recovery diode clamps the positive voltage to a low value as the step recovery diode begins conducting. The positive current will then begin another cycle of charging and discharging and another pulse can again be produced in the following cycle.

When the step recovery diode is unbiased and a damped train of sinusoidal waves as shown in FIG. 3 is applied, no sharp output pulse will be produced. The step recovery diode produces a pulse only when the stored charge across the capacitance $C_R$ in the forward direction is withdrawn completely by the reverse current. In the damped sine wave current applied to the step recovery diode, the successive integrated area of the positive and negative halves of the sine wave current are steadily decreasing. As a result, the first half is charging the step recovery diode to the extent of the area underneath it. During the negative second half of the damped sine wave current, the step recovery diode is not completely discharged, thus the diode will be able to conduct during the negative half of the damped sine wave current on account of this. As the third positive half begins to charge the step recovery diode, the step recovery diode will have no trouble conducting and in fact will continue to conduct as long as the damped train wave lasts. Thus, the damped train wave as shown in FIG. 3 will pass the step recovery diode as if the step recovery diode had a forward resistance $R_F$ put in its place.

In order to generate sharp pulses by what shall be referred to as the "Second Reverse Discharge" method, the series of damped sine waves with the first half cycle conducting as shown in FIG. 3*a* will be applied to the step recovery diode simultaneously with a negative bias. The initial current wave will be tilted downward due to the almost linear rise of current produced by the D.C. bias, as shown in FIG. 5*a*.

Figure 5A:
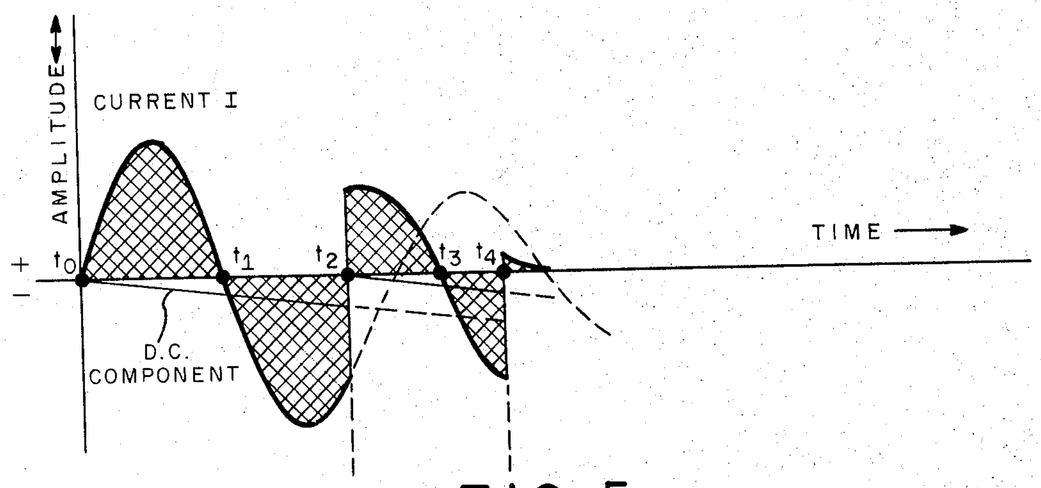
FIGS. 5*a*, *b* and *c* are respective plots of circuit current, condenser voltage and output pulse waveforms of a pulse generation circuit using the second reverse discharge method with moderate bias.
Figure 5B:
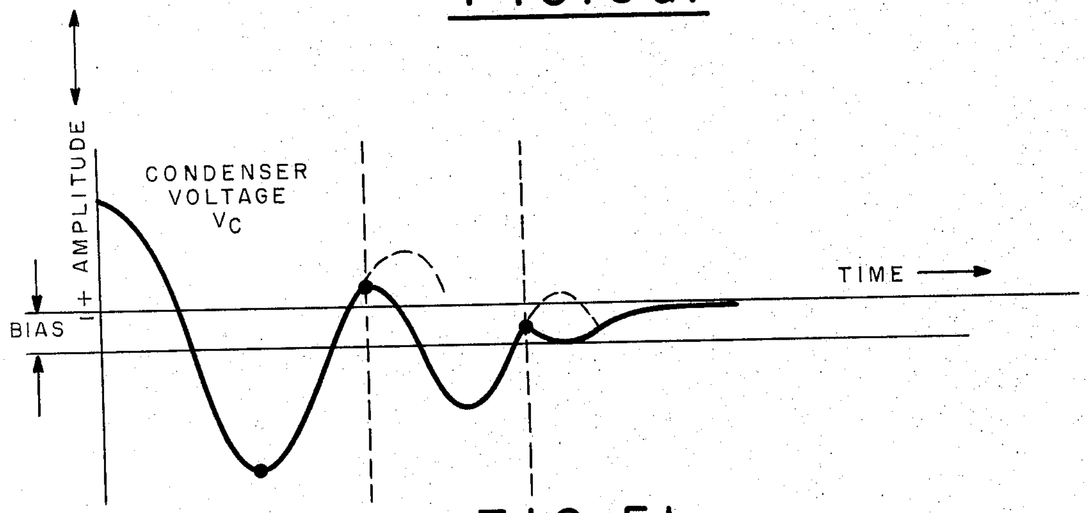
Figure 5C:
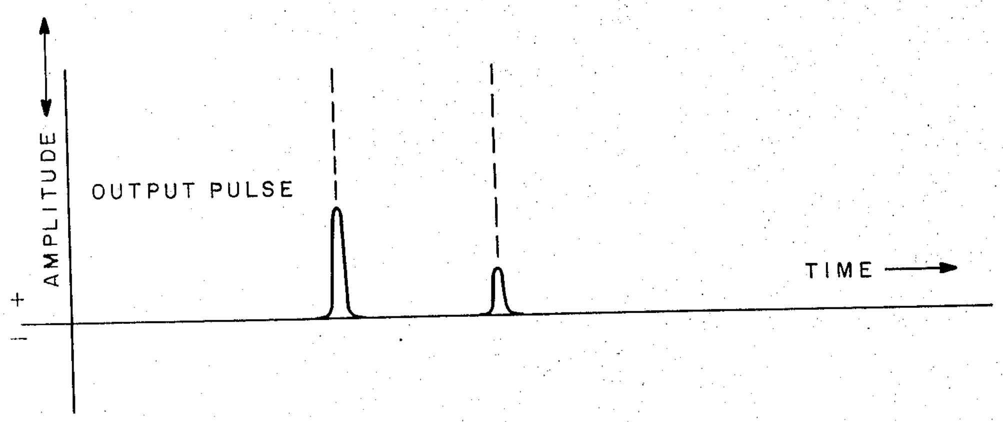

Referring to FIGS. 5*a*, 5*b* and 5*c*, at the instant $t_2$, the charge withdrawal due to the negative current during the interval $t_1$ to $t_2$ will be equal to the charge stored on the capacitance $C_R$ due to the positive current during the time interval $t_o$ to $t_1$ as determined by comparing the cross-hatched areas underneath the curves. The step recovery diode will perform the current switching at the instant $t_2$. The voltage across the condenser $C_1$ at this instant is still positive in spite of the presence of the negative bias voltage. Under this condition, the current will switch to a positive value almost discontinuously as shown in FIG. 5*a*. Due to losses in the circuit, as described above during the flow of positive current in the circuit, the magnitude of the positive current will be slightly less than that of the negative current.

The dotted curves in the FIGS. 5*a* and 5*b* indicate the plot of the current and voltage waveforms if the step recovery diode did not switch. The voltage across the condenser $C_1$ is not discontinuous at the instant $t_2$ but its derivitive is discontinuous. At the instant $t_2$, the voltage across the condenser $C_1$ starts to decrease toward negative instead of increasing as before switching of the step recovery diode. After the instant $t_2$, the capacitance $C_R$ starts recharging during the interval between $t_2$ and $t_3$. Subsequently, between the interval $t_3$ and $t_4$, the capacitance $C_R$ discharges sufficiently to produce switching of the step recovery diode. At this time, however, the voltage across the condenser $C_1$ at the instant $t_4$ is negative, therefore, the positive current in the circuit after switching of the step recovery diode at the instant $t_4$ is much lower and decays exponentially. The pulse generated at the instant $t_4$ as shown in FIG. 5*c* is lower in magnitude than the pulse generated at the instant $t_2$. After the time $t_4$, it is no longer possible for the step recovery diode to produce output pulses.

Figures 6A, 6B:
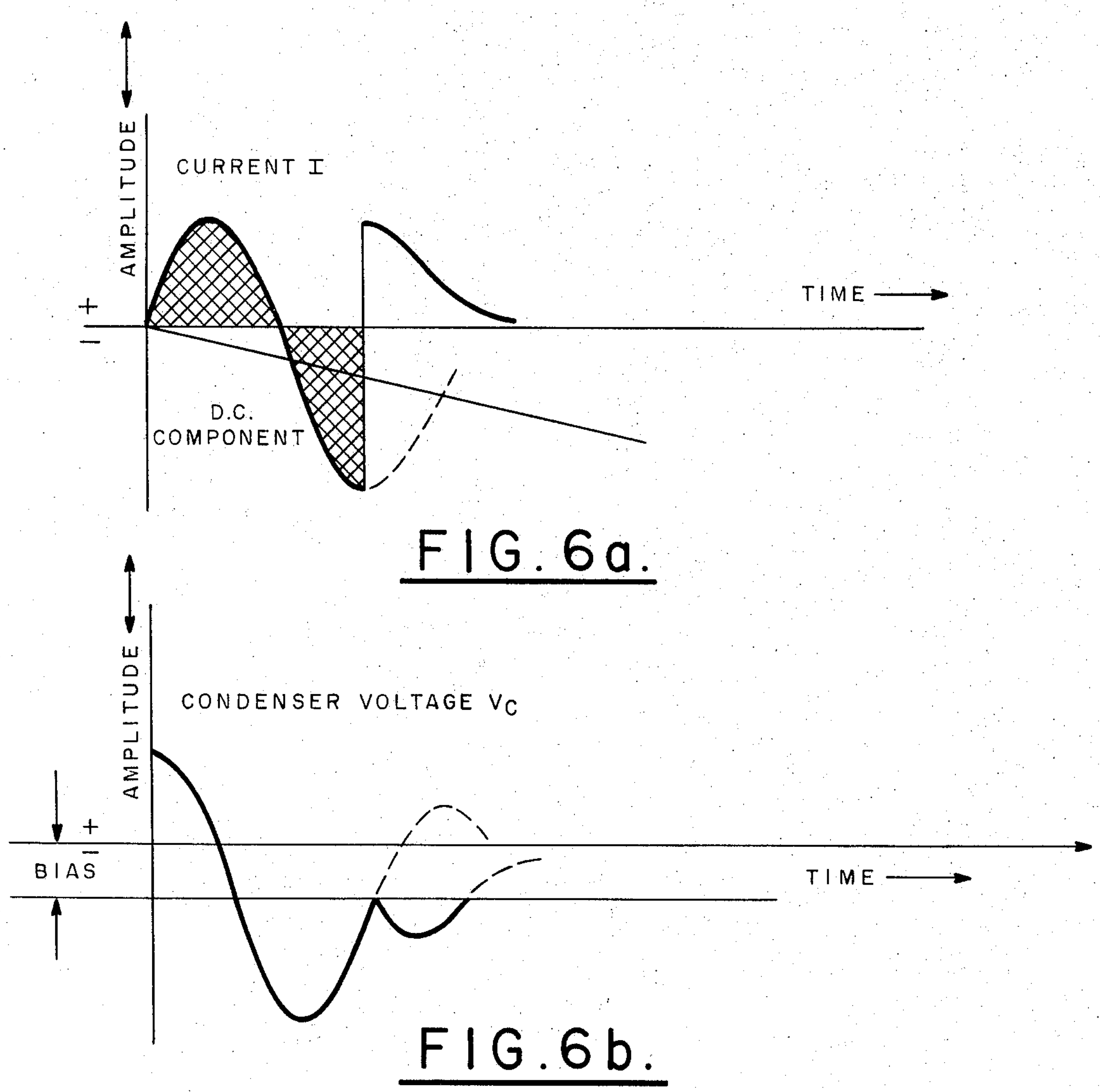
FIGS. 6*a*, *b* and *c* are respective plots of circuit current, condenser voltage and output pulse waveforms of a pulse generation circuit using the second reverse discharge method with substantially optimum bias.
Figure 6C:
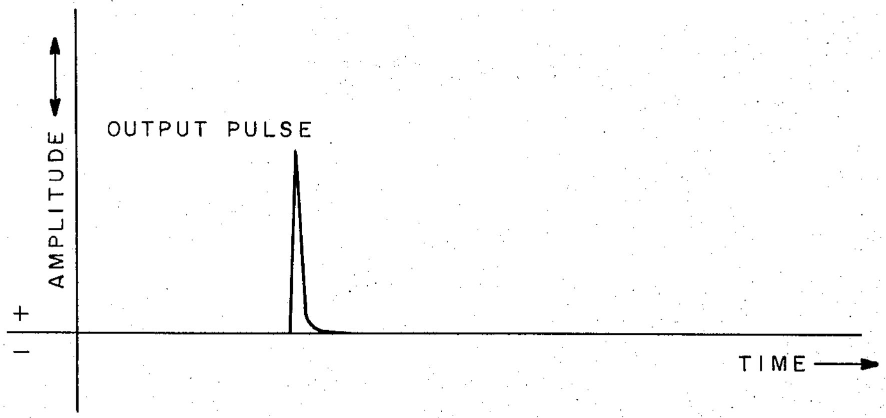
Figure 7A:
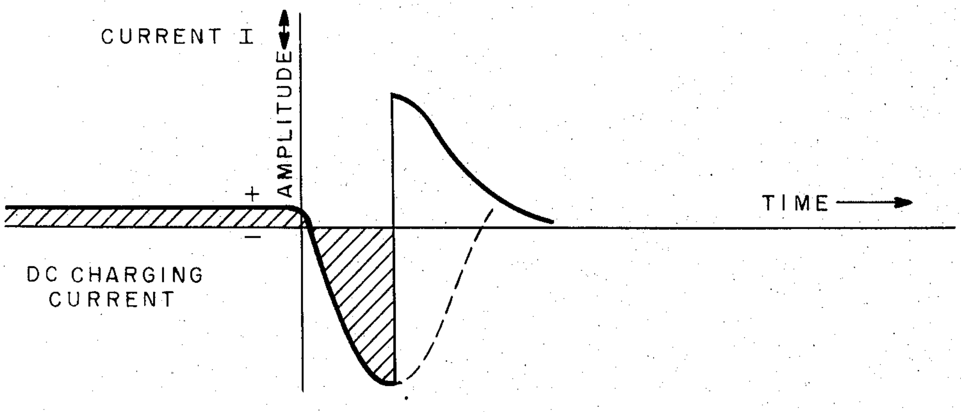
FIGS. 7*a*, *b* and *c* are respective plots of circuit current, condenser voltage and output pulse waveforms of a pulse generation circuit using the first reverse discharge method with optimum bias.
Figure 7B:
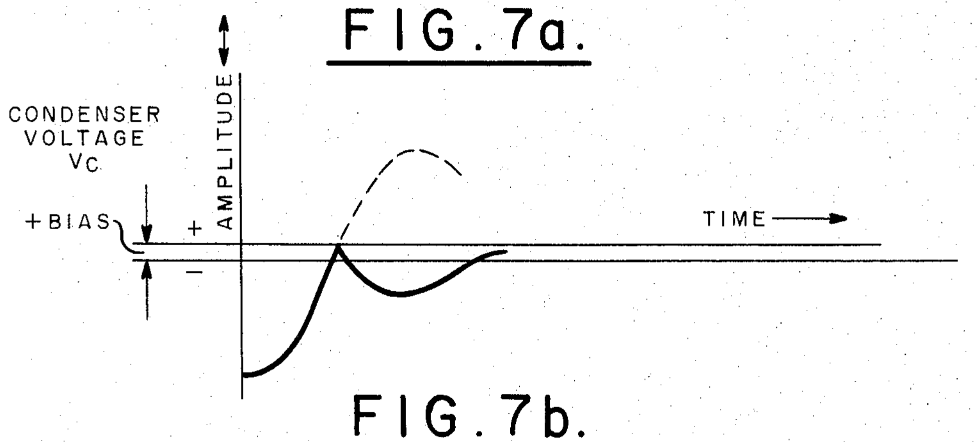
FIGS. 7*d* and 7*e* are output pulse waveforms of a pulse generation circuit using the first reverse discharge method with too low and too high a bias respectively.
Figure 7C:
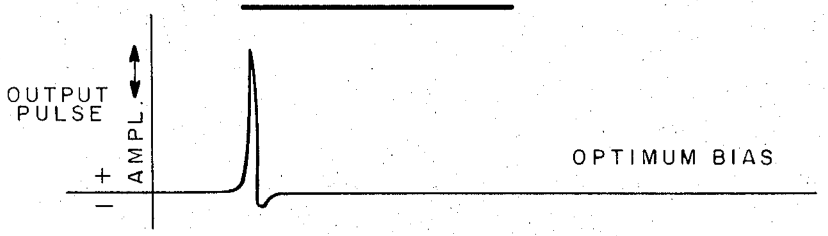
Figure 7D:
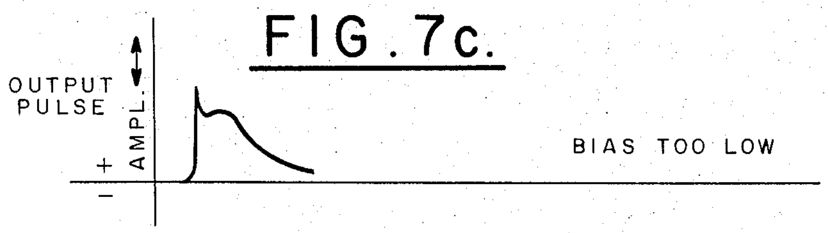
Figure 7E:
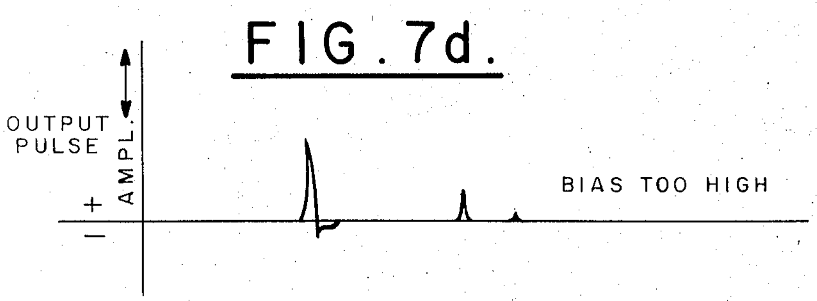

FIGS. 6*a*, 6*b* and 6*c* illustrate the voltage and current waveforms produced in the circuit when the negative bias is further increased. The first pulse shown in FIG. 6*c* is generated under the condition when the voltage across the condenser $C_1$ is negative. It will be noted that under these conditions only a single pulse is generated. There is quite a range of negative bias conditions under which a single pulse can be obtained. Usually there is an optimum bias voltage that can produce the maximum single pulse voltage. However, a bias which is too high will not only cause a diminishing of the amplitude of the pulse voltage but will also provide a pulse having a poor waveshape because of the long trailing edge that will be produced. The range of bias voltages is relatively broad insofar as the peak voltage of the pulse is concerned. In order to obtain the best waveshape, it is desirable to adjust the bias voltage to be slightly less than that required for the peak pulse voltage. As shown in FIGS. *5a* and *5b*, there is a d.c. current component associated with the waveform because of the loss of charge through recombination in the step recovery diode. The d.c. current is small especially when the diode is pulsed at a low repetition rate. Since this current is positive and the d.c. voltage is negative, only a passive bias resistance is necessary. Since the bias d.c. current is dependent on the repetition rate, the resistance is determined in accordance with the repetition rate in order to obtain optimum bias.

In the "First Reverse Discharge" method, a steady d.c. forward bias current is applied to the step recovery diode and the damp sine wave train is applied to the step recovery diode so that the first half cycle is used to discharge the step recovery diode. The amount of stored charge on the capacitance $C_R$ in the long interval between pulses depends upon the carrier lifetime of the step recovery diode. For instance, if the carrier lifetime is relatively long in comparison with the half period of the damped sine wave, the d.c. current required will be negligible in comparison with the current amplitude of the pulse train. As shown in FIGS. *7a* and *7b*, the step recovery diode can be made to switch at any point during the first half cycle by adjusting the d.c. bias to the proper value. By switching the step recovery diode at the point when the current is nearly at its negative peak as shown in FIG. *7a*, and optimum single pulse can be generated such as the pulse in FIG. *7c*. The reversed position current in the condenser voltage will simply decay without having a sufficient opportunity to discharge for a second pulse. Insufficient bias can cause the step recovery diode to switch too early thereby producing a pulse having a low amplitude and a long trailing edge as shown in FIG. *7d*. Using a d.c. bias which is too high can cause the step recovery diode to switch too late which will thereby produce a pulse of low amplitude and possibly generating multiple pulses as shown in FIG. *7e*.

The operation of the pulse generating circuit shown in FIG. 2 will be described first by using the "First Reverse Discharge" method. The bias control circuit 15 may be either of the configurations shown in *2a* or *2b* or an equivalent bias circuit employing a source of d.c. power.

A trigger pulse produced by the control trigger generator 11 is coupled through the diode 20 to the base terminal b of the transistor 22. The transistor 22 is a common emitter mode transistor which is operated in the avalanche region thereby functioning as an impulse generator. The transistor should have a relatively hard breakdown characteristic so that the current rise time at the breakdown voltage, $V_{CBO}$, is relatively short. The resistance value of the base resistor 21 coupled to the junction of the diode 20 and the terminal b of the transistor 22 should be chosen so that the holding current of the collector is set to be stable at a level just below threshold for a maximum collector voltage, $V_C$, on the transistor 22. As a result the trigger voltage from the control trigger generator 11 may be relatively low but of sufficient amplitude to force the transistor 22 into conduction thereby discharging the condenser 25 which has been charged from the d.c. power supply 50 through the series combination of the inductor 23 and resistor 24. The discharge path for the condenser 25 will be through the transistor 22 to ground. The duration of the output pulse across the variable resistor 26 is determined by the value of capacitance in the capacitor 25 and the value of resistance in the rest of the circuit comprised principally of the transistor 22, the capacitor 25 and the variable resistance 26. The value of the resistor 24 and the resistance in the inductor 23 in combination with the capacitance of the capacitor 25 is chosen so that the resultant RC time constant is on the order of the repetition period, T, that is, long compared with the impulse period, $c = \pi/\omega$.

The impulse outputs provided at the wiper arm terminal c of the variable resistance 26 is coupled into the cascaded half T sections of the filter circuit 13 which essentially matches the low input impedance of the step recovery diode circuit with the high output impedance of the impulse generator circuit. The LC constant of the filter circuit 13 comprised of the inductors 27, 31 and capacitors 30, 32 must closely approximate the designed sine wave frequency $\omega$, of the damped sine wave output from the filter 13. This is mathematically expressed as:

$$L_1C_1 = L_2C_2 = 1/\omega^2,$$

wherein $L_2 > L_1$ and $C_1 < C_2$ or more exactly expressed as: $\omega = \sqrt{1/L_1C_1 - (R_F/2L)^2}$
in which $L_1$ is the inductance of the inductor 31, $C_1$ is the capacitance of the capacitor 32, $L_2$ is the inductance in the inductor 27, $C_2$ is the capacitance in the capacitor 30 and $R_F$ includes any resistance in the inductors 27 and 31 along with the forward resistance of the step recovery diode 14.

The filter circuit 13 will produce a damped sine wave output voltage having a damping constant $\delta = R_F/2L_1$.

The inductance $L_1$ of the inductor 31 must be chosen so that when it is combined with the reverse capacitance $C_R$ of the step recovery diode 14 it will produce an output subnanosecond pulse having a half period $t_p/\omega = \sqrt{L_1C_R}$.

Since the circuit being described is employing the "first reverse discharge" method a steady d.c. forward bias current is being supplied from the bias control circuit 15 to the step recovery diode 14 as indicated in FIG. *7a* by the crossed-hatched area to the left of the amplitude ordinate. The current produced by the first half cycle of the sine wave output from the filter 13 is indicated by the cross-hatched area to the right of the amplitude ordinate in FIG. *7a*. When the sine wave voltage applied across the step recovery diode 14 equals the positive bias voltage as indicated in FIG. *7b* the diode discharge through the capacitor 34 producing a subnanosecond output pulse as shown in FIG. *7c*. As indicated above, the optimum single pulse can be generated by having the step recovery diode 14 switching at a point where the current is nearly at its negative peak. The reverse positive current and the condenser voltage simply decay away without having sufficient time to discharge to produce a second pulse.

The operation of the circuit in FIG. 2 for the "second reverse discharge" method is substantially similar to the operation described above using the "first reverse discharge" method. Since the step recovery diode 14 is to be charged by the applied damped since wave voltage rather than by the steady d.c. forward bias current from the supply in the bias control circuit 15, the bias circuit shown in FIG. 2*c* or its equivalent is used in place of the bias circuit shown in FIGS. 2*a* or 2*b*.

A trigger pulse produced by the control trigger generator 11 is coupled through the diode 20 and applied to the base of the transistor 22 discharging the capacitor 25 through the transistor 22 to ground thereby producing an output pulse across the variable resistor 26. The output impulse is coupled into the filter 13 which in turn produces a damped sine wave oscillation that is applied to the step recovery diode 14.

As shown in FIG. 6*a* the current I produced by the applied sine wave voltage charges the step recovery diode 14 through the first half positive cycle and the portion of the negative cycle prior to switching of the step recovery diode 14. During the second half cycle of the current I as indicated in FIG. 6*a*, at the instant the charge withdrawal due to the negative current is equal to the charge stored on the capacitors $C_R$ of the step recovery diode 14, the step recovery diode 14 will perform the current switching which will produce the output pulse shown in FIG. 6*c*. This will occur as shown in FIG. 6 at the time the positive going negative half cycle of the condenser voltage $V_c$ is equal to the negative bias voltage on the step recovery diode 14 which is produced by the bias circuit 15.

The "First Reversed Discharge" method provides the following advantages over the "Second Reverse Discharge" method: the bias adjustment is less critical for optimum operation; less impulse drive is required for a given output pulse and the generation of multiple pulses is less likely to occur. Alternatively, the "First Reverse Discharge" method also requires an active d.c. supply; a step recovery diode in which the carrier lifetime must be relatively high and the step recovery diode must be capable of dissipating more power.

In an actual embodiment of the invention, the filter circuit 13 was made of TEM strip transmission line. Thus the inductances 27 and 31 comprised short sections of the strip line. The inductance per unit length of such a strip is $Z_0/C$, where $Z_0$ is the characteristic impedance of the line and C is the velocity of light in the line. The condensers 30 and 31 have values in the range of 30–200 pfd and are manufactured with high quality ceramic capacitors having ribbon electrodes. These condensers may be slidably mounted to the transmission line thereby enabling the inductances 27 and 31 to be varied experimentally until optimum values are obtained. Typically, the length of transmission line required for the inductances 27 and 31 varies from one-eighth inch to three-fourth inch for a 50 ohm plastic dielectric strip transmission line. Impulses generated with the disclosed circuit using elements within the foregoing ranges have been typically 180v peak amplitudes with 180–200 ps widths at the half voltage points and 50v peak amplitudes with 80–100 ps widths at the half voltage points.

While the invention has been described in its preferred embodiments, it is to be undestood that the words which have been used are words of description rather than limitation and that changes may be made within the purview of the appended claims without departing from the true scope and spirit of the invention in its broader aspects.

I claim:

1. A pulse generator circuit comprising
a source of trigger pulses for producing a plurality of pulses at a specific repetition rate,
impulse generator means coupled to said source of trigger pulses for producing output pulses at the same repetition rate as said trigger pulses,
filter means having a value of inductance L coupled to said impulse generator means for converting each of said output pulses into a damped sine wave oscillation having predetermined angular frequency, ω, and a predetermined damping constant, δ
a step recovery diode having a reverse capacitance $C_R$ and a forward resistance $R_F$ such that: $\delta \doteq R_F/2L$, said diode being coupled to said filter means, and
bias control circuit means coupled to said step recovery diode for controlling the conduction of said step recovery diode whereby only a single subnanosecond pulse having a half period, $t_p/\pi \doteq \sqrt{LC_R}$, is produced by said step recovery diode in response to said damped wave oscillation.

2. A pulse generator circuit as recited in claim 1 in which said impulse generator means includes a step function generator series coupled to a differentiator circuit for producing output pulses having a pulse width $C = \pi/\omega$.

3. A pulse generator circuit as recited in claim 1 in which said impulse generator includes a common emitter mode transistor operating in the avalanche region of the transistor characteristic.

4. A pulse generator circuit as recited in claim 3 in which said impulse generator includes a resistive-capacitive circuit means for providing a charging time constant which is long with respect to the time period between said output pulses.

5. A pulse generator circuit as recited in claim 1 in which said filter means includes a pair of cascaded half-T sections in which each section comprises an inductor and a capacitor in combination.

6. A pulse generator circuit as recited in claim 1 in which said bias control circuit means comprises a passive circuit for controlling the conduction of said step recovery diode whereby said single subnanosecond pulse is produced by said recovery diode during the second half cycle of said damped sine wave oscillation.

7. A bias control circuit as recited in claim 6 which includes an inductor in series with the parallel combination of a capacitor and a resistor.

8. A pulse generator circuit as recited in claim 1 in which said bias control circuit means includes a source of electrical power for applying a charging current to said step recovery diode prior to the application of said damped sine wave oscillation.

9. A pulse generator circuit as recited in claim 8 in which said bias control circuit means further includes means for controlling the conduction of said step recovery diode whereby a single subnanosecond pulse is produced during the conduction of the first half cycle of said damped sine wave oscillation.

10. A pulse generator circuit as recited in claim 9 in which said bias control circuit means includes a parallel combination of a variable resistor, a fixed resistor and a d.c. power source.

11. A pulse generator circuit as recited in claim 9 in which said bias control circuit means includes a series combination of an inductor, a resistor and a d.c. power source.

12. A method for producing a subnanosecond pulse comprising the steps of applying a plurality of trigger pulses at a specific repetition rate from a trigger pulse generator to an impulse generator, producing a plurality of impulse output pulses at the same repetition rate as said trigger pulses, applying said impulse output pulses to a filter having an inductance L, producing a damped sine wave oscillation having a predetermined angular frequency, $\omega$ and a predetermined damping constant, $\delta$ applying said damped sine wave oscillation to a step recovery diode having a reverse capacitance $C_R$ and a forward resistance $R_F$ such that the damping constant $\delta$ is a function of the reverse capacitance $C_R$ and the forward resistance $R_F$ in accordance with the relation: $\delta \doteq R_F/2L$, and producing a single subnanosecond output pulse having a half period, $t_p/\pi \doteq \sqrt{LC_R}$ in response to said applied damped sine wave.

13. A method for producing a subnanosecond pulse as recited in claim 12 further comprising the step of applying a charging current to said step recovery diode prior to the application of said damped sine wave oscillation.

14. A method for producing a subnanosecond baseband pulse as recited in claim 13 further comprising the step of controlling the conduction of said step recovery diode whereby said single subnanosecond pulse is produced during the conduction of the first half cycle of said damped sine wave oscillation.

15. A method for producing a subnanosecond pulse as recited in claim 12 further comprising the step of controlling said step recovery diode whereby said single subnanosecond pulse is produced by said step recovery diode during the conduction of the second half cycle of said damped sine wave oscillation.

* * * * *